(12) United States Patent
Sommers

(10) Patent No.: US 11,388,078 B1
(45) Date of Patent: Jul. 12, 2022

(54) METHODS, SYSTEMS, AND COMPUTER READABLE MEDIA FOR GENERATING AND USING STATISTICALLY VARYING NETWORK TRAFFIC MIXES TO TEST NETWORK DEVICES

(71) Applicant: Keysight Technologies, Inc., Santa Rosa, CA (US)

(72) Inventor: Christian Paul Sommers, Bangor, CA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 161 days.

(21) Appl. No.: 16/436,856

(22) Filed: Jun. 10, 2019

(51) Int. Cl.
| | |
|---|---|
| *H04L 43/00* | (2022.01) |
| *H04L 45/00* | (2022.01) |
| *H04L 43/50* | (2022.01) |
| *H04L 43/062* | (2022.01) |
| *G06F 7/58* | (2006.01) |
| *H04L 41/147* | (2022.01) |
| *H04L 41/14* | (2022.01) |
| *H04L 43/04* | (2022.01) |

(52) U.S. Cl.
CPC .............. *H04L 43/50* (2013.01); *G06F 7/582* (2013.01); *H04L 41/145* (2013.01); *H04L 41/147* (2013.01); *H04L 43/04* (2013.01); *H04L 43/062* (2013.01)

(58) Field of Classification Search
None
See application file for complete search history.

(56) References Cited

U.S. PATENT DOCUMENTS

| | | |
|---|---|---|
| 5,526,283 A | 6/1996 | Hershey et al. |
| 5,557,559 A | 9/1996 | Rhodes |
| | (Continued) | |

FOREIGN PATENT DOCUMENTS

| | | |
|---|---|---|
| EP | 0 895 375 A2 | 2/1999 |
| EP | 1 465 367 A1 | 10/2004 |
| | (Continued) | |

OTHER PUBLICATIONS

Advisory Action and After Final Consideration Program Request for U.S. Appl. No. 15/207,412 (dated Jan. 16, 2020).
(Continued)

*Primary Examiner* — Sai Aung

(57) ABSTRACT

A method for generating and using a statistical mix of network traffic to test a network device is provided. The method includes steps performed in a network equipment test device. The steps include generating test packets to be transmitted to a device under test. The steps further include using a random number generator to generate first values that statistically vary according to a first probability density function (PDF). The steps further include precalculating and storing in memory, a plurality of second values that statistically vary according to a second probability density function different from the first probability density function. The method further includes using the first values to access the memory and select from the second values. The steps further include using the selected second values to statistically vary an aspect of the test packets. The steps further include transmitting the test packets to the device under test.

19 Claims, 4 Drawing Sheets

(56) References Cited

U.S. PATENT DOCUMENTS

| | | | |
|---|---|---|---|
| 5,568,471 | A | 10/1996 | Hershey et al. |
| 5,586,266 | A | 12/1996 | Hershey et al. |
| 5,671,351 | A | 9/1997 | Wild et al. |
| 5,761,486 | A | 6/1998 | Watanabe et al. |
| 5,787,147 | A | 7/1998 | Gundersen |
| 5,812,529 | A | 9/1998 | Czarnik et al. |
| 5,905,713 | A | 5/1999 | Anderson et al. |
| 6,028,847 | A | 2/2000 | Beanland |
| 6,137,782 | A | 10/2000 | Sharon et al. |
| 6,148,277 | A | 11/2000 | Asava et al. |
| 6,172,989 | B1 | 1/2001 | Yanagihara et al. |
| 6,173,333 | B1 | 1/2001 | Jolitz et al. |
| 6,252,872 | B1 | 6/2001 | Tzeng |
| 6,321,264 | B1 | 11/2001 | Fletcher et al. |
| 6,343,078 | B1 | 1/2002 | Bronstein et al. |
| 6,414,942 | B1 | 7/2002 | Ito et al. |
| 6,507,923 | B1 | 1/2003 | Wall et al. |
| 6,526,259 | B1 | 2/2003 | Ho |
| 6,580,707 | B1 | 6/2003 | Ikeda et al. |
| 6,601,020 | B1 | 7/2003 | Myers |
| 6,606,721 | B1 | 8/2003 | Gowin, Jr. et al. |
| 6,621,805 | B1 | 9/2003 | Kondylis et al. |
| 6,625,764 | B1* | 9/2003 | Dawson ............ H04L 41/24 714/703 |
| 6,744,783 | B1 | 6/2004 | Tzeng |
| 6,789,100 | B2 | 9/2004 | Nemirovsky et al. |
| 6,798,746 | B1 | 9/2004 | Kloth et al. |
| 6,950,405 | B2 | 9/2005 | Van Gerrevink |
| 6,990,529 | B2 | 1/2006 | Yang et al. |
| 7,002,918 | B1 | 2/2006 | Prieto, Jr. et al. |
| 7,161,902 | B2 | 1/2007 | Carter et al. |
| 7,257,082 | B2 | 8/2007 | Dugatkin |
| 9,001,688 | B2 | 4/2015 | Dragulescu et al. |
| 10,776,535 | B2 | 9/2020 | Gintis |
| 2001/0039590 | A1 | 11/2001 | Furukawa et al. |
| 2002/0015387 | A1 | 2/2002 | Houh |
| 2002/0037008 | A1 | 3/2002 | Tagami et al. |
| 2002/0080781 | A1 | 6/2002 | Gustavsson |
| 2002/0093917 | A1 | 7/2002 | Knobbe et al. |
| 2002/0105911 | A1 | 8/2002 | Pruthi et al. |
| 2002/0138226 | A1 | 9/2002 | Doane |
| 2002/0177977 | A1 | 11/2002 | Scarlat et al. |
| 2003/0012141 | A1 | 1/2003 | Gerrevink |
| 2003/0043434 | A1 | 3/2003 | Brachmann et al. |
| 2003/0099243 | A1 | 5/2003 | Oh et al. |
| 2003/0158719 | A1* | 8/2003 | Jacobi ............ H04L 41/0893 703/16 |
| 2003/0172177 | A1 | 9/2003 | Kersley et al. |
| 2003/0179777 | A1 | 9/2003 | Denton et al. |
| 2004/0083208 | A1 | 4/2004 | Kroening et al. |
| 2005/0025054 | A1 | 2/2005 | Srivatsan et al. |
| 2005/0027503 | A1 | 2/2005 | Kumar et al. |
| 2007/0110053 | A1* | 5/2007 | Soni ............ H04L 69/22 370/389 |
| 2007/0291650 | A1 | 12/2007 | Ormazabal |
| 2009/0034596 | A1 | 2/2009 | Chen et al. |
| 2009/0059804 | A1 | 3/2009 | Fujikami et al. |
| 2013/0074058 | A1 | 3/2013 | Gounares et al. |
| 2014/0160961 | A1 | 6/2014 | Dragulescu et al. |
| 2015/0032437 | A1 | 1/2015 | Kumar et al. |
| 2015/0092549 | A1 | 4/2015 | Anand et al. |
| 2016/0088499 | A1 | 3/2016 | Logan et al. |
| 2017/0061041 | A1 | 3/2017 | Kumar et al. |
| 2017/0063690 | A1* | 3/2017 | Bosshart ............ H04L 69/22 |
| 2018/0011955 | A1 | 1/2018 | Gintis et al. |
| 2019/0175120 | A1* | 6/2019 | Huang ............ A61B 5/0006 |
| 2020/0005201 | A1* | 1/2020 | Fife ............ G06Q 10/04 |
| 2020/0313999 | A1* | 10/2020 | Lee ............ H04L 43/0847 |

FOREIGN PATENT DOCUMENTS

| | | |
|---|---|---|
| JP | H11136288 A | 5/1999 |
| JP | 2002101128 A | 4/2002 |
| JP | 3902606 B2 | 4/2007 |
| WO | WO 2018/013296 A1 | 1/2018 |

OTHER PUBLICATIONS

Final Office Action for U.S. Appl. No. 15/207,412 (dated Oct. 21, 2019).

Non-Final Office Action for U.S. Appl. No. 15/207,412 (dated Apr. 24, 2019).

Non-Final Office Action for U.S. Appl. No. 15/207,412 (dated Jul. 3, 2018).

"Ethernet Traffic Generation," Albedo Telecom, pp. 1-17 (2013).

Notice of Allowance and Fee(s) Due for U.S. Appl. No. 10/404,864 (dated Apr. 5, 2007).

Commonly-Assigned, co-pending U.S. Appl. No. 10/404,864 for "Self-Similar Traffic Generation," (Unpublished, filed Mar. 31, 2003).

"The World's Fastest & Most Programmable Networks", Barefoot Networks, pp. 1-14 (Copyright 2019).

"P416 Language Specification version 1.1.0", The P4 Language Consortium, pp. 1-147 (Nov. 30, 2018).

Notification of Transmittal of the International Search Report and the Written Opinion of the International Searching Authority, or the Declaration for International Application No. PCT/US2017/038201 (dated Sep. 18, 2017).

Ixia Data Sheet, "XCELLON-MULTIS® QSFP 40/10GE Load Modules," https://www.ixiacom.com/sites/default/files/2016-05/xcellon-multis-qsfp-4010ge-load-modules.pdf, pp. 1-14 (May 2016).

Morton, "IMIX Genome: Specification of Variable Packet Sizes for Additional Testing," IETF RFC 6985, pp. 1-10 (Jul. 2013).

Ixia Solution Brief, "IxLoad," pp. 1-4 (Feb. 2012).

Notice of Allowance and Fee(s) Due for U.S. Appl. No. 13/962,666 (dated Feb. 9, 2015).

"Traffic Generators for Internet Traffic," https://www.icir.org/models/trafficgenerators.html, pp. 1-3 (Sep. 2010).

Decision to grant a European patent pursuant to article 97(2) EPC for European Patent Application Serial No. 04251177.4 (dated Dec. 21, 2006).

Summons to attend oral proceedings pursuant to Rule 71(1) EPC for European Patent Application Serial No. 04251177.4 (Dec. 19, 2005).

Office Action for Japanese Patent Application Serial No. 2004-107997 (dated Apr. 25, 2006).

"Load Modules—Multilayer Glglbit Ethernet for LM1000LX, LM1000SX, LM1000GBIC, LM1000T," Ixia, Product Specification Sheet, 2 pages (Sep. 14, 2005).

Communication pursuant to Article 96(2) EPC for European Patent Application Serial No. 04 251 177.4 (dated Jun. 2, 2005).

Notice of Allowance and Fee(s) Due and Interview Summary for U.S. Appl. No. 09/906,882 (dated May 31, 2005).

European Search Report for European Patent Application Serial No. 04 25 1177 (dated Jun. 9, 2004).

Zec et al., "Real-Time IP Network Simulation at Gigabit Data Rates," Proceedings of the 7th International Conference on Telecommunications (ConTEL), pp. 1-8 (Jun. 2003).

Ye et al., "Large-Scale Network Parameter Configuration Using an On-line Simulation Framework," pp. 1-19 (2003).

Delgado-Restituo et al., "Integrated Chaos Generators," Proceedings of the IEEE, vol. 90, No. 5, pp. 747-767 (May 2002).

Kramer et al., "Interleaved Polling with Adaptive Cycle Time (IPACT): A Dynamic Bandwidth Distribution Scheme in an Optical Access Network," Photonic Network Communications, vol. 4, No. 1, pp. 89-107 (2002).

Ulanovs et al., "Modeling Methods of Self-Similar Traffic for Network Performance Evaluation," Scientific Proceeding of RTU, Series 7, Telecommunications and Electronics, pp. 40-49 (2002).

(56) References Cited

OTHER PUBLICATIONS

Wallerich, "Self-Similarity and Heavy Tailed Distributions," Design and Implementation of a WWW Workload Generator for the NS-2 Network Simulator (Chapter 2.2), NSWEB, 2 pages (Nov. 1, 2001).
Guo et al., "How Does TCP Generate Pseudo-self-similarity?," In Proceedings of the International Workshop on Analysis and Simulation of Computer and Telecommunications Systems, MASCOTS '01, 9 pages (Aug. 2001).
Kramer et al., "Interleaved Polling with Adaptive Cycle Time (IPACT): Protocol Design and Performance Analysis," pp. 1-37 (Jul. 2001).
Kramer, Self-similar Network Traffic: The notions and effects of self-similarity and long-range dependence, http://wwwcsif.cs.ucdavis.edu/~kramer/papers/ss_trf_present2.pdf>, pp. 1-10 (May 21, 2001).
Kramer, "Generator of Self-Similar Network Traffic (version 2)," U.C. Davis, 3 pages (Apr. 4, 2001).
Sikdar et al., "The Effect of TCP on the Self-Similarity of Network Traffic," Proceeding of 35th Conference on Information Sciences and Systems, 6 pages (Mar. 2001).
Mondragón et al., "Chaotic maps for traffic modelling and queueing performance analysis," Performance Evaluation, vol. 43, pp. 223-240 (2001).
Sikdar et al., "On the contribution of TCP to the Self-Similarity of Network Traffic," Proceedings of IWDC, vol. 2170, pp. 596-613 (2001).
Kramer, "Generator of Self-Similar Network Traffic," U.C. Davis, 3 pages (Sep. 25, 2000).
Mandeville et al., "Benchmarking Methodology for LAN Switching Devices," RFC 2889, pp. 1-35 (Aug. 2000).
Veres et al., "The Chaotic Nature of TCP Congestion Control," Proceedings of IEEE INFOCOM, Tel-Aviv, 9 pages (Mar. 2000).
Kramer, "On Generating Self-Similar Network Traffic Using Pseudo-Pareto Distribution," Tutorial, U.C. Davis, 5 pages (2000).
Zhang et al., "Fractal Network Traffic: From Understanding to Implications," The 6th International Conference on Telecommunication Systems, Modeling and Analysis, 1 page (Mar. 1998).
Crovella et al., "Long-Lasting Transient Conditions in Simulations with Heavy-Tailed Workloads," Proceedings of the 1997 Winter Simulation Conference (WSC-97), pp. 1005-1012 (Dec. 1997).
Paxson, "Fast, Approximate Synthesis of Fractional Gaussian Noise for Generating Self-Similar Network Traffic," Computer Communication Review, vol. 27, No. 5, pp. 5-18 (Oct. 1997).
Samuel et al., "Fast Self-Similar Traffic Generation," Proceedings of the Fourteenth UK Teletraffic Symposium on Performance Engineering in Information Systems, Manchester UK, p. 8/1-8/4 (Mar. 1997).
Willinger et al., "Self-Similarity Through High-Variability: Statistical Analysis of Ethernet LAN Traffic at the Source Level," IEEE/ACM Transactions on Networking, vol. 5, No. 1, pp. 71-86 (Feb. 1, 1997).
Taqqu et al, "Proof of a Fundamental Result in Self-Similar Traffic Modeling," 19 pages (1997).
Brakmo et al., "Experiences with Network Simulation," ACM Sigmetrics International Conference on Measurement and Modeling of Computer Systems, pp. 80-90 (May 23, 1996).
Willinger et al., "Self-Similarity and Heavy Tails: Structural Modeling of Network Traffic," pp. 1-26 (1996).
Willinger et al., "Self-Similarity Through High-Variability: Statistical Analysis of Ethernet LAN Traffic at the Source Level," Proc. of the ACM/Sigcomm '95, 14 pages (1995).
Leland et al., "On the Self-Similar Nature of Ethernet Traffic (Extended Version)," IEEE/ACM Transactions on Networking, vol. 2, No. 1, pp. 1-15 (Feb. 1994).
Notice of Allowance and Fee(s) Due for U.S. Appl. No. 15/207,412 (dated Jun. 10, 2020).
Delgado-Restituto et al., "Integrated Chaos Generators," Proceedings of the IEEE, vol. 90, No. 5, pp. 747-767 (May 2002).
Kramer, "On Generating Self-Similar Traffic Using Pseudo-Pareto Distribution," Tutorial, U.C. Davis, 5 pages (2000).

\* cited by examiner

METHODS, SYSTEMS, AND COMPUTER READABLE MEDIA FOR GENERATING AND USING STATISTICALLY VARYING NETWORK TRAFFIC MIXES TO TEST NETWORK DEVICES

TECHNICAL FIELD

The subject matter described herein relates to testing network devices. More particularly, the subject matter described herein relates to methods, systems, and computer readable media for generating and using statistically varying mixes of network traffic to test network devices.

BACKGROUND

In testing network devices, it is desirable to generate realistic mixes of network traffic and transmit such traffic to the devices. Most processors used in network equipment test devices that generate network traffic have built in hardware random number generators (RNGs) to facilitate randomization of network traffic. Built-in RNGs utilize a native or intrinsic probability density function (PDF) to randomize packet traffic, which does not necessarily model realistic network behavior, such as burstiness in network traffic, random packet traffic patterns, random packet lengths, random traffic mixes, etc. As a result, traffic mixes generated using a random number generator that is based on the native probability density function of the random number generator may not adequately test network devices prior to putting the devices in service. In some examples, the PDF used by built-in RNGs may be a uniform PDF. In other examples, built-in RNGs might exhibit some other native (not uniform) PDF, which likewise is not suitable for modelling all kind of traffic.

Another problem associated with existing packet generators is that some packet generator architectures do not include any feedback loops in the packet generation pipelines. Such an architecture may provide deterministic packet processing times. However, a pipelined architecture may limit the ability to statistically vary traffic patterns.

Accordingly, in light of these difficulties, there exists a need for improved methods, systems, and computer readable media for generating and using statistically varying network traffic mixes to test network devices.

SUMMARY

According to one aspect of the subject described herein, a method for generating and using a statistically varying mix of network traffic to test a network device is provided. The method includes steps performed in a network equipment test device including at least one processor. The steps include generating test packets to be transmitted to a device under test. The steps further include using a random number generator to generate values that statistically vary numbers according to a first probability density function (PDF). The steps further include precalculating and storing in memory, a plurality of second values that statistically vary according to a second probability density function different from the first probability density function. The steps further include using the number values produced using the first random number generator to access the memory and select from the second values. The steps further include using the second values to statistically vary an aspect of the test packets. The steps further include transmitting the test packets to the device under test.

The term "random", as used herein, refers to "having a distribution that statistically varies according to one or more probability density functions". A random value may be generated using a random number generator implemented in hardware, software, or firmware. Alternatively, a random value may be generated using a lookup table of precalculated values stored in memory. In another alternative, a random number value may be generated using a combination of a random number generator and a lookup table.

According to one aspect of the subject matter described herein, the first probability density function comprises a native probability density function of a random number generator.

According to another aspect of the subject matter described herein, the second probability density function comprises a non-native probability density function.

According to yet another aspect of the subject matter described herein, using the selected second values to statistically vary an aspect of the test packets includes rate limiting the test packets using the selected second values.

According to yet another aspect of the subject matter described herein, using the selected second values to statistically vary an aspect of the test packets includes adding, deleting, or populating protocol headers using the selected second values.

According to yet another aspect of the subject matter described herein, using the selected second values to statistically vary an aspect of the test packets includes adding, deleting, or populating packet payload data using the selected second values.

According to yet another aspect of the subject matter described herein, adding, deleting, or populating packet payload data includes generating a pseudo header following a protocol header and modifying contents of the pseudo header.

According to yet another aspect of the subject matter described herein, modifying contents of the pseudo header includes modifying contents of the pseudo header using a P4 programmable packet transmit pipeline.

According to yet another aspect of the subject matter described herein, utilizing the second random numbers value to statistically vary an aspect of the test packets includes assigning packet streams to output ports or port groups using the selected second values.

According to yet another aspect of the subject matter described herein, using the selected second values to statistically vary an aspect of the test packets includes generating bursts of traffic that vary over time according to the selected second values.

According to yet another aspect of the subject matter described herein, a system for generating and using a statistical mix of network traffic to test a network device is provided. The system includes a packet generator for generating test packets to be transmitted to a device under test. The system further includes a random number generator to generate first values that statistically vary according to a first probability density function. The system further includes a memory for storing a plurality of second values that statistically vary according to a second probability density function different from the first probability density function. The system further includes a packet transmit pipeline for using the first values to access the memory and select from the second values, using the selected second values to statistically vary an aspect of the test packets, and transmitting the test packets to the device under test.

According to yet another aspect of the subject matter described herein, a non-transitory computer readable medium having stored thereon executable instructions that when executed by the processor of a computer control the computer to perform steps is provided. The steps include generating test packets to be transmitted to a device under test. The steps further include utilizing a random number generator to generate first values that statistically vary according to a first probability density function. The steps further include precalculating and storing in memory a plurality of second values that statistically vary according to a second probability density function different from the first probability density function. The steps further include using the first values to access the memory and select from the second values. The steps further include using the selected second values to statistically vary an aspect of the test packets. The steps further include transmitting the test packets to the device under test.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

Figure 1:
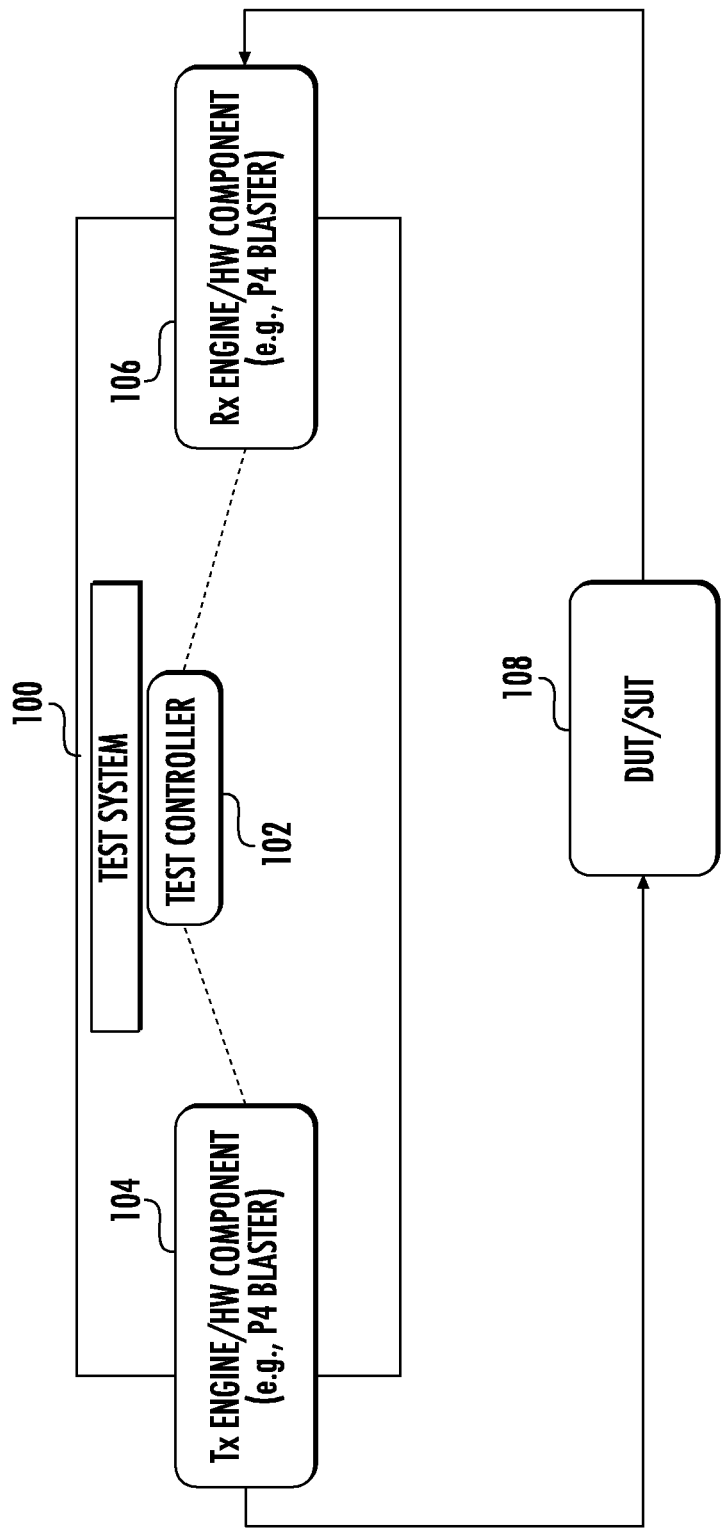
FIG. 1 is a block diagram illustrating an exemplary architecture for testing a network device.

The subject matter described herein includes methods, systems, and computer readable media for generating and using a statistically varying mix of network traffic to test a network device. FIG. 1 is a block diagram illustrating an exemplary overall architecture for generating and using a statistically varying mix of network traffic to test a network device. In FIG. 1, a test system 100 includes a test controller 102, a packet transmit engine 104, and a packet receive engine 106. Test controller 102, transmit engine 104, and receive engine 106 may each include at least one processor and a memory. Test controller 102, transmit engine 104, and receive engine 106 may also include network ports implemented using network interface cards to transmit packets to and receive packets from a network. The network interface cards may be capable of generating Ethernet frames and other protocol layers that utilize Ethernet for transport. In the case of transmit engine 104, the network interface card and the associated processor may generate realistic mixes of application traffic, where the application traffic utilizes transmission control protocol/Internet protocol (TCP/IP), user datagram protocol/Internet protocol (UDP/IP), and/or stream control transmission protocol/Internet protocol (SCTP/IP) transport to transmit packets to device under test 108. In one example, transmit engine 104 may be configurable to generate an Internet mix (IMIX) of network traffic, for example, as described in Internet Engineering Task Force (IETF) Request for Comments (RFC) 6985, the disclosure of which is incorporated herein by reference in its entirety.

In one example, packet transmit engine 104, packet receive engine 106, and test controller 102 may be implemented using the P4 programming language, as described in the P416 Language Specification, version 1.1.0, The P4 Language Consortium, 2018 Nov. 30, the disclosure of which is incorporated herein by reference in its entirety. P4 is a programming language that is dedicated to program the data plane of network devices. The language is specifically tailored to express how packets are forwarded by the data plane of a programmable forwarding element, such as a forwarding field programmable gate array (FPGA) in a network router or switch. At run time, the data plane is implemented using tables and an application programming interface (API) provided to the control plane. The control plane populates the tables (e.g. via a CPU), and the data plane performs lookups in the tables to perform match-action processing, such as make packet forwarding decisions, packet header editing, etc.

One key feature of some devices that utilize the P4 programming language is the deterministic packet processing time at the data plane layer. The packet processing time is deterministic because the packet generation pipeline does not include any feedback loops. Packet transmit engine 104 may implement this deterministic packet processing time using the P4 architecture while generating a statistically varying mix of network traffic. One example of a P4 programmable Ethernet switch suitable for use in packet transmit engine 104 is the Tofino or Tofino2 programmable network switch available from Barefoot Networks, Inc. (www.barefootnetworks.com). Test controller 102 may configure transmit engine 104 to transmit a statistically varying mix of network packets to device under test 108. Receive engine 106 may receive packets that are transmitted by or through device under test 108 to measure the response of device under test 108 to the statistically varying mix of network packets. In one example, device under test 108 may be a firewall, test controller 102 may configure transmit engine 104 to transmit a statistically varying mix of traffic to the network protected by the firewall, and packet receive engine 106 may monitor throughput of legitimate packet traffic passing through the firewall as an indication of performance of the firewall. In another example, device under test 108 may be a server, test controller 102 may configure transmit engine 104 to transmit a statistically varying mix of traffic to the server in which the volume of traffic increases over time to stress test the server. Packet receive engine 106 may monitor latency of responses of the server to the stress testing as an indication of performance of the server.

Figure 2:
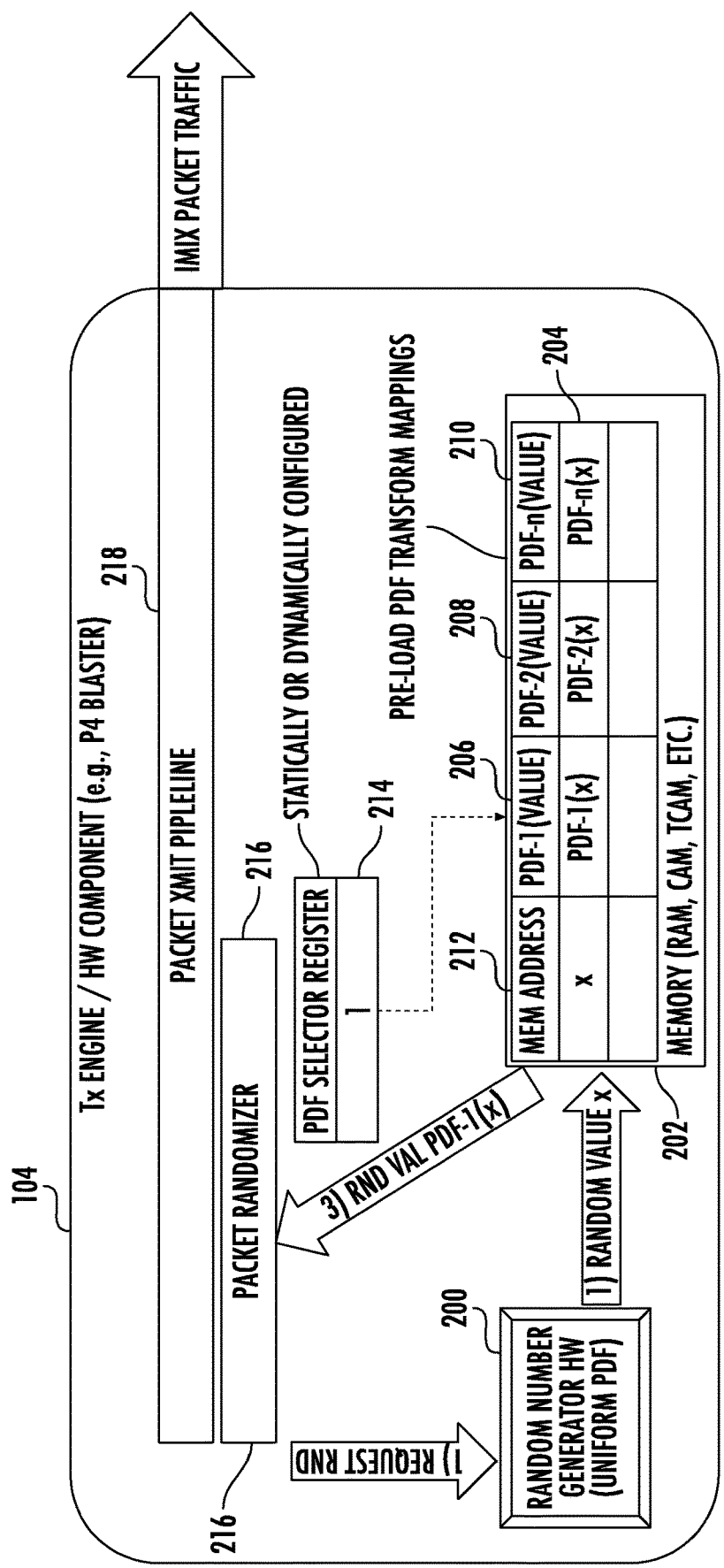
FIG. 2 is a block diagram illustrating in more detail a packet transmit engine for generating a statistically varying mix of network traffic using different probability density functions.

FIG. 2 is a block diagram illustrating an exemplary architecture for transmit engine 104 in more detail. Referring to FIG. 2, transmit engine 104 includes a random number generator 200 that generates random numbers according to a first probability density function. The first probability density function may be the native probability density function of random number generator 204. In one example, the native probability function of random number generator 204 may be a uniform probability density function. In another example, the native probability density function of random number generator 204 may be a non-uniform probability density function.

Transmit engine 104 further includes a memory 202 that may be preconfigured with a table 204. Table 204 may map numbers generated using random number generator 200 to random numbers generated using one or more probability density functions that are different from that utilized by random number generator 200. For example, if the probability density function used by random number generator 200 is a uniform probability density function, the probability density function used to populate one or more columns in table 204 may be a non-uniform probability density function, such as a Poisson probability density function, a geometric probability density function, an exponential probability density function, etc.

In one example, each column in table 204 may include precalculated values generated according to the different probability density functions. For example, column 206 may store precalculated values generated using a random number generator that randomly selects values from a distribution that varies according to a Poisson probability density function. Column 208 may store values generated using a random number generator that randomly selects values from a distribution of values that varies according to an exponential probability density function. Column 210 may store values generated using a random number generator that randomly selects values from a distribution of values that varies according to a geometric probability density function. Column 212 in the illustrated example stores values used to index the values stored in columns 206, 208, and 210. The index values in column 212 may correspond to a number space that could be generated by random number generator 200. Alternatively, instead of storing random numbers selected from different PDFs in the same lookup table, the random numbers selected from each different PDF may be stored in a different lookup table.

When random number generator 200 generates a random number, that value is used to select a row in memory 202. A PDF selector register 214 may include n bits used for selecting one of $2^n$ columns in table 204 or one of $2^n$ tables, where each table stores precalculated values randomly selected from a different probability density function. In the illustrated example, the value of PDF selector register 214 is 1, indicating that the first non-index column or column 206 will be selected. Column 206 stores random values that are generated using a Poisson PDF. The output from random number generator 200 is used to select a row in column 206, and the corresponding value is output.

The value of PDF selector register 214 may be set to a fixed value or to vary during a test. For the fixed case, the network operator may set PDF selector register 214 to a specific value corresponding to one of the columns in table 204 so that random numbers output by random number generator 200 are mapped to random numbers generated using the same probability density function. For the variable case, the network operator may set the value of PDF selector register 214 to change over time during a test so that the probability density function used to map values output by random number generator 200 varies during a test.

In operation, a traffic randomizer 216 requests a random number from random number generator 200. Random number generator 200 generates a random number according to its native probability density function and uses the random number to access table 204. PDF selector register 214, by selecting a column in table 204, selects the PDF used to map the input random number to an output random number. Memory 202 outputs the mapped random number generated using the different probability function to traffic randomizer 216. Traffic randomizer 216 provides the random number to packet transmit pipeline 218, which randomizes one or more aspects of generated network packets to be transmitted to the device under test and transmits the statistically varying mix of traffic to the device under test.

It should be noted that if multiple traffic aspects are randomized, then different random numbers may be used to randomize the different traffic aspects so that the randomization between the desired traffic aspects will not be correlated. Alternatively, if correlation is desired, the same random number can be used to randomize different aspects of packet traffic.

It should also be noted that while FIG. 2 illustrates a single random number generator and a single table of precalculated values mapped to the output of the random number generator, the subject matter described herein is not limited to using a single random number generator and a single lookup table. In general, x random number generators can be used with y lookup tables, where x and y are both integers of at least one. There could be any number of random number generators, for example, one to govern each aspect of packet traffic desired to be randomized, and the random number generators could be sampled at different rates using timers. Some traffic randomization processes might want a new random number for every input packet, while others might want them the random number generators to be sampled periodically. In one exemplary implementation, transmit pipeline 218 may include a pool of such RNGs/timers/lookup tables assigned flexibly or statically to the traffic items being randomized. In one example, a Poisson mapping table may be shared by plural RNGs and used to map values generated by the RNGs to random numbers selected from a Poisson distribution. Subsequent lookups in the table based on the output from the RNGs can be used to randomize different aspects of packet traffic as the packet traffic travels through transmit pipeline 218.

Figure 3:
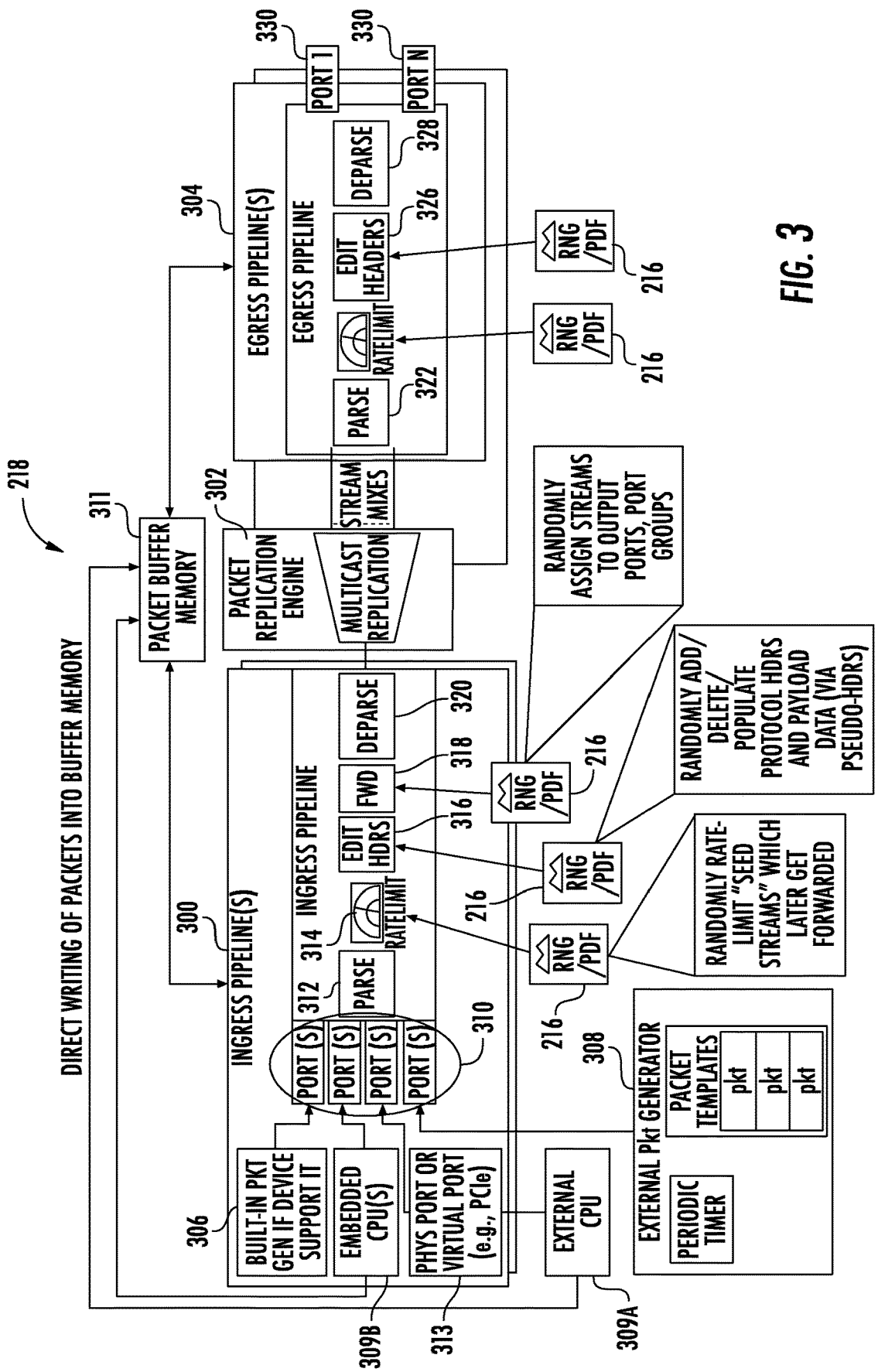
FIG. 3 is a block diagram illustrating ingress and egress portions of the packet transmit pipeline of FIG. 2 for statistically varying different aspects of network traffic generation.

FIG. 3 illustrates exemplary aspects of test traffic that can be randomized using the random numbers generated by the random number generator and the random number mapping table in FIG. 2. In FIG. 3, transmit pipeline 218 includes one or more ingress pipelines 300, a packet replication engine 302, and one or more egress pipelines 304. Ingress pipelines 300 each include a series of programmable processing elements connected in series to generate network traffic. In the illustrated example, one of these processing elements includes either a built-in packet generator 306 or an external packet generator 308 that generates packet templates with parameters to be randomized. In another example, the packet generator may be implemented using an external CPU 309A or embedded CPU 309B. Embedded CPU 309B may write packets into an internal port, such as one of ingress ports 310 or into internal packet buffer memory 311. External CPU 309A could write packets into an external physical port 313, or one or more of internal ports 310 (e.g. via a PCIe bus), or to packet buffer memory 311. The packets can be recirculated inside of ingress pipeline 218 to generate continuous packet streams that can be modified randomly.

As stated above, in one example, the generated packet templates are provided to ingress ports 310 of ingress pipeline 300. A parser 312 parses the packet templates into packet header vectors (PHVs) and packet payloads. The packet header values in the packet header vectors can be randomized. As will be described in more detail below, even though the P4 architecture does not permit modification of packet payload values, ingress pipeline 300 may randomize packet payload values by treating a portion of the payload as a fake or pseudo header.

In FIG. 3, a rate limiter 314 may utilize the random numbers generated using the architecture illustrated in FIG. 2 to randomly rate limit packets which are transmitted to the device under test. For example, traffic randomizer 216 may output random numbers generated using the multi-PDF architecture illustrated in FIG. 2 and provide the random numbers to rate limiter 314. Rate limiter 314 may randomly rate limit seed streams which are subsequently forwarded at different rates to the device under test.

In another example, a packet header editor 316 may randomly insert, delete, and populate protocol headers and payload data using the random numbers generated using the architecture illustrated in FIG. 2. If the packet header field to be modified is the multiprotocol label switching (MPLS) label stack, the random numbers output by traffic randomizer 216 may be used to set MPLS label depth. Additional examples of packet header and payload values that can be modified will be described below.

In another example, a stream assignment module 318 may randomly assign streams of packets to output port or port groups using the random numbers generated using traffic randomizer 216. Traffic randomizer 216 may output random numbers generated using the architecture illustrated in FIG. 2 to stream assignment module 318. Stream assignment module 318 may utilize the random numbers to select an egress port or port group to which each packet stream is forwarded.

A deparser 320 deparses the packet header vectors and reassembles the headers and payloads into complete packets including fields that have been randomized for transmission to the DUT. Packet replication engine 302 replicates the packet streams into multicast stream mixes to be transmitted to the device(s) under test.

A parser 322 parses the packets into packet header vectors and packet payload vectors. A rate limiter 324 may utilize the random numbers output from the architecture illustrated in FIG. 2 to randomly rate limit packet streams on the egress side. In one example, traffic randomizer 216 may output random numbers using the multi-PDF architecture illustrated in FIG. 2 to rate limiter 324. Rate limiter 324 may use the random numbers to randomly rate limit different packet streams. A header editor 326 may randomly insert, delete, or populate protocol header and payload fields using the random numbers output using the architecture illustrated in FIG. 2. In one example, traffic randomizer 216 may generate random numbers using the architecture illustrated in FIG. 2. Header editor 316 may use the random numbers to randomly modify, add, delete or populate protocol header or payload fields based on the random numbers. A deparser 328 deparses the packet header and payload vectors, extracts packet headers and payloads from the vectors, and reassembles the packet headers and payloads into complete packets for transmission to the device(s) under test via output ports 330. It should be noted that the order of processing blocks between parser 312 and deparser 320 and between parser 322 and deparser 328 is arbitrary and can be changed without departing from the scope of the subject matter described herein.

As illustrated in FIG. 3, the output of randomizer 216 may be used to randomize traffic generation at any point in the packet transmit pipeline 218. It should also be noted that the output of randomizer 216 may be provided at multiple points in transmit pipeline 218 to randomize different aspects of transmitted packets. The following are example traffic manipulations that can be performed by randomizer 216 in combination with traffic generation pipeline 218.

In the examples, the output of a randomizer 216 (with some PDF) can be used to manipulate traffic in real time. Note that most of these techniques can be accomplished with traditional stateful programming, where the variable parameters are not derived from random numbers, but instead from fixed (via CPU) configurations, or stateful elements such as single-stage or chained/cascaded counters. However, such common methods generate deterministic, cyclical traffic, rather than statistically varying traffic.

Packet Length Mixes

Randomizer 216, in combination with packet transmit pipeline 218 (including ingress pipeline 300 and/or egress pipeline 304) may generate variable packet length mixes at data plane speeds by the following techniques:

1. Mixing Streams of Different Lengths.

The output of randomizer 216 may be used by packet transmit pipeline 218 in selecting packets destined for an output port from among several packet streams from a packet generator source(s), whether internal to an application specific integrated circuit (ASIC), or externally-generated, e.g. in a field programmable gate array (FPGA), external CPU or internal embedded CPU. These streams could consist of fixed-length or variable-length packet templates which are to be further modified in transmit pipeline 218. The selecting can be accomplished by executing lookups in forwarding tables 318, which in turn can cause a packet to be sent (unicast) to a specific egress port or multicast to a multicast group, using packet replication engine 302. A multicast group can be arbitrarily complex and consist of lists of individual egress ports, port groups (load-balancing groups or link aggregation groups). To restate, this mixing of packet lengths can be governed based on random numbers with arbitrary PDFs.

2. Dynamically Adding/Deleting Standard Header Fields.

Standard protocol header fields can be added or deleted on the fly by header editor 316 and/or 326 of transmit pipeline 218 based on random numbers output by packet randomizer 216. Neglecting momentarily the effect on the protocol stack itself, this has the effect of changing the packet length. Additionally, header stacks in P4 act like an array of identically formatted header fields of depth 1-N. For example, virtual local area network (VLAN) tags are typically one or two deep, MPLS labels sometimes as deep as 8, etc. The depth of these stacks can be varied from 0-N (where N is a maximum per a particular P4 source code). The depth of these header stacks, as well as the subsequently-populated fields in each layer of the stack, can be modified using the PDFs.

3. Adding/Deleting/Modifying Pseudo Header Fields

P4 programmed devices cannot access payload data; they can only manipulate headers. The difference in processing is: all headers are extracted in the parser and stuffed into a pipeline packet header vector (PHV), which is a wide field (as much as thousands of bits). The PHV memory and associated resources is very expensive. All of the fields in the PHV can be accessed by ingress and egress pipeline stages as the PHV propagates down the pipelines. Conversely, all remaining packet data, e.g. the payload, is stored in a comparatively cheap buffer. At the end of the ingress or egress pipeline, the headers are reassembled (deparsed) and the payload is appended.

Since P4 devices cannot access the payload, they cannot manipulate its length or content easily. However, we can treat the first N bytes of payload following the last real header field as if these N bytes were another header or several headers. So, for example, if we treated the first 100 bytes of payload as a 100-deep stack of a contrived 1-byte data header and extracted it into our PHV during parsing, this data will not be stored in the payload buffer, instead it will travel down the pipeline. We could shrink the stack in increments of 1 byte at will in the pipeline and effectively prune the beginning of the payload dynamically, thus shortening the packet. Conversely, we could choose to not extract any payload into the PHV, but instead add 1-n bytes of data header during deparsing and populate the data header bytes with data of our choosing, thus growing the packet. We can also edit this header data (see application-layer header editing, below).

Practically, existing commercial ASICs can only parse/deparse several hundred bytes of header, but this is a contemporary economic constraint, not a theoretical one. Thus, starting with a fixed template packet to be modified, we can perhaps change its length via such pseudo header techniques by +/−a few hundred bytes. However, by creating numerous fixed-length packet streams of different ranges in hundred-byte increments, for example, we could select from among them in real-time using a selection process (lookup tables) then from there add or delete pseudo headers. Thus, the template selection is coarse-grained control, and the header grow/shrink mechanisms is fine-grained control.

Packet Header Population

P4 allows editing the contents of packet header fields. Any field which is described in the P4 parse graph is available for manipulation in the P4 pipeline, (subject to device resource constraints which are allocated and verified by the compiler). The header contents affect the header protocol operation. For example, the header contents can affect source and destination addresses; UDP/TCP port numbers (which are associated with application layer protocols like hypertext transfer protocol (HTTP) on port 80 or HTTP on port 443); and so on. Static lookup tables and stateful techniques are routinely used to manipulate the header contents of packets for both normal datacenter switching and routing, as well as in visibility applications, such as network packet brokers (NPBs), and testing (packet testers). The subject matter described herein utilizes RNGs and PDFs to control header population within programmed constraints. Examples of protocol header population that can be achieved using the architecture described herein include randomly populating Ethernet address, IP address, virtual extensible LAN (VXLAN) network identifier (VNI), TCP/UDP port fields, etc.

Application-Layer Content Population

Applications such as HTTP contain payloads whose content could be modified by overlaying pseudo headers, as described above, extracting a portion of the payload into the pipeline PHV, then manipulating the content of the payload in real time based on random numbers.

Adding/Deleting Tunnel Headers and Protocol Stacks

Random numbers generated by randomizer 216 can be used to control the addition or deletion of protocol headers to affect the protocol, not just the length as mentioned earlier. For example, packet generation pipeline 218 could vary the relative proportions of different types of traffic comprising mixes of tunneled (VXLAN) vs non-tunneled, VLAN vs. non-VLAN, etc.

Time-Varying Behavior Based on Random Numbers

All of the techniques described herein can also be further enhanced by using random numbers to vary traffic patterns versus time. Instead of varying the content of a packet based on a random number generated at that moment, a random value can be used to affect traffic patterns based on time. Examples:

1. Random values could be used to trigger a burst of N packets of length L for duration T microseconds, where N, L and T are all based on random numbers generated by randomizer 216 using different PDFs. The bursts could furthermore be scheduled to vary during a 24-hour period to mimic known traffic patterns which are nevertheless somewhat random.
2. A random value could be used to randomly mix multiple streams of traffic differently over time.

Fixed+Random Components

All parameters accepting variable inputs affected by random numbers can use a combination of fixed and random numbers. For example, IP addresses can be constrained to be random within a certain subnet; packet lengths could be varied between a min and max range; etc. The distribution of random values can be controlled by a suitable PDF, so it is not simply a or other native distribution, as the use case dictates.

Figure 4:
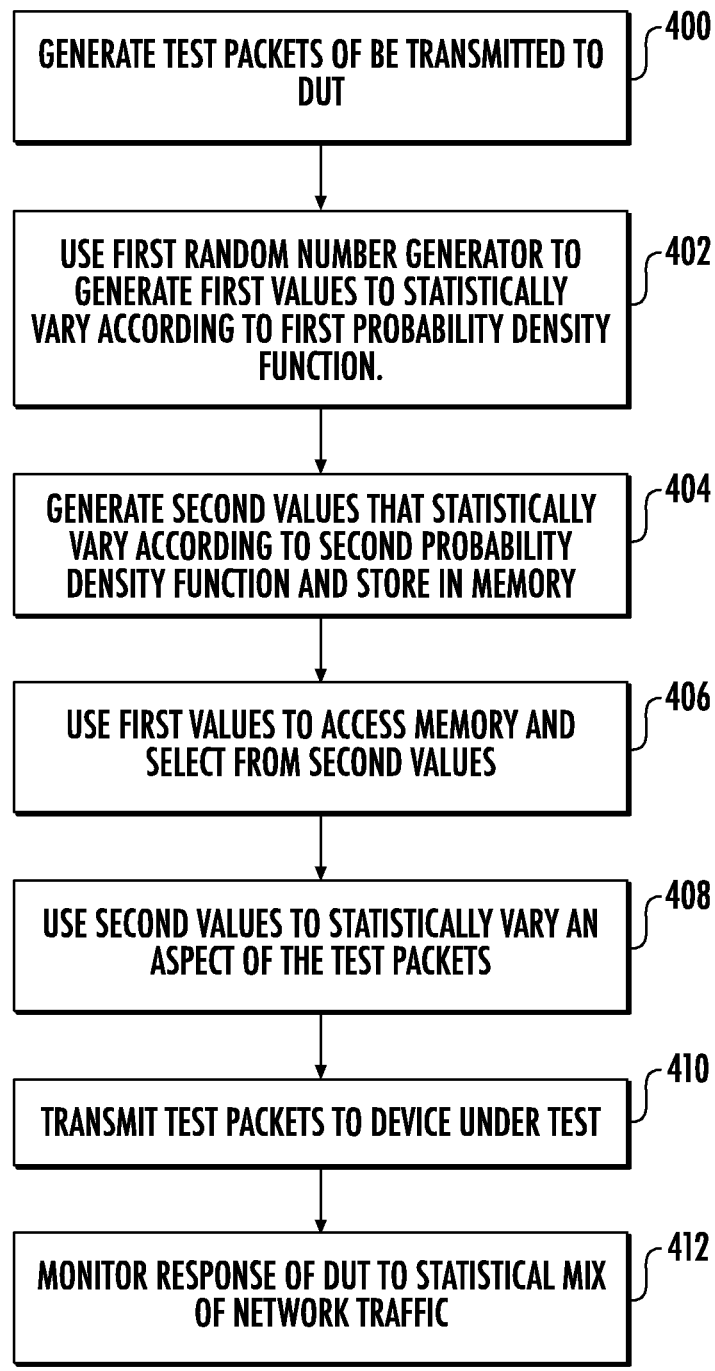
FIG. 4 is a flow chart illustrating an exemplary process for generating and using a statistically varying mix of network traffic to test a device under test.

FIG. 4 is a flow chart illustrating an exemplary process for generating and using a statistically varying network traffic mix to test one or more devices under test. Referring to FIG. 4, in step 400, test packets to be transmitted to a device under test are generated. For example, packet generator 306 or 308 may generate test packets. The test packets may be templates with blank or default values for some header parameters to be randomized.

In step 402, the method includes using a first random number generator to generate first values that statistically vary according to a first probability density function. For example, random number generator 200 illustrated in FIG. 2 may generate random numbers according to a uniform or other probability density function.

In step 404, a plurality of second values that statistically vary according to a second probability density function are generated and stored in memory. The second probability density function may be different from the first probability density function. For example, test controller 102 may utilize a non-non-uniform probability density function, such as a Poisson probability density function, a geometric probability density function, an exponential probability density function, etc., and use that function to generate random numbers. The random numbers may be stored in table 204 of memory 202.

In step 406, the method includes using the random number values to access the memory and select from the second values generated using the second probability density function. For example, random numbers generated using random number generator 200 may be used to access table 204 to produce output values. In general, the subject matter described herein may utilize n layers of randomization (lookup tables and RNGs) using different PDFs, to generate each output value used to randomize traffic, where n is an integer of at least 2 and is only limited by the maximum packet generation time and the amount of memory available to store the precalculated statistically varying numbers.

In step 408, the process includes using the second random number values to statistically vary an aspect of the test packets. As illustrated in FIG. 3, the random number values can be used to randomly rate limit packets, randomly add, delete, or populate protocol headers and payload data, and/or to randomly assign packet streams to output ports.

In step 410, the test packets are transmitted to the device under test. For example, statistically varied streams of packets may be output from egress pipelines 304 and transmitted to the device under test.

In step 412, the response of the device under test to the statistically generated traffic mix is monitored. For example, test packet receive engine 106 illustrated in FIG. 1 may include one or more network visibility devices, such as network taps and/or network packet brokers that monitor the packets that pass through or are generated by device under test 108. Such a response may be used to characterize the performance or functionality of device under test 108. For example, if device under test 108 is a network firewall, packet receive engine 106 may monitor packets that pass through the firewall to determine whether device under test 108 is functioning properly. If device under test 108 is a server, receive engine 106 may monitor the latency of the server in response to statistically varying streams of packets generated by transmit engine 104.

Because the subject matter described herein uses different probability density functions to randomize aspects of packet traffic, the resulting packet streams may be more realistic than packet streams that are generated using only a uniform or other native probability density function. In addition, because the random number values generated according to at least one of the probability density functions are precalculated and stored in memory, the generation of statistical mixes of network packets can be implemented using a pipelined architecture, such as that illustrated in FIG. 3, without feedback loops. Generating statistically varying mixes of network packets without utilizing feedback loops can result in deterministic test packet generation time.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for generating and using a statistical mix of network traffic to test a network device, the method comprising:
    generating test packets to be transmitted to a device under test;
    parsing the test packets to place packet headers in packet header vectors, a first N bytes of packet payloads in the packet header vectors, thereby treating the first N bytes of the packet payloads as a fake or pseudo-header so that the first N bytes of the packet payloads will be processed by the P4 programmable transmit pipeline, and parsing remaining bytes of the packet payloads in a payload buffer;
    propagating the packet header vectors down a P4 programmable packet transmit pipeline that does not permit modification of packet payloads;
    utilizing a random number generator to generate first values that statistically vary according to a first probability density function;
    precalculating and storing in memory a plurality of second values that statistically vary according to a second probability density function different from the first probability density function;
    using the first values to access the memory and select from the second values;
    using the selected second values to statistically vary an aspect of the test packets, wherein using the selected second values to statistically vary an aspect of the test packets includes using the selected second values to randomly add, delete, or populate at least one of protocol headers and packet payload data, wherein using the selected second values to randomly add, delete, or populate the at least one of protocol headers and packet payload data includes, for each packet, using the selected second values to manipulate content of the first N bytes of the payloads in the packet header vectors in real time at a predetermined point in the P4 programmable packet transmit pipeline;
    deparsing the packet header vectors and the packet payloads to form reassembled test packets; and
    transmitting the reassembled test packets to the device under test.

2. The method of claim 1 wherein the first probability density function comprises a native probability density function of the random number generator.

3. The method of claim 2 wherein the second probability density function comprises a non-native probability density function.

4. The method of claim 1 wherein using the selected second values to statistically vary an aspect of the test packets includes rate limiting the test packets using the selected second values.

5. The method of claim 1 wherein using the selected second values to randomly add, delete, or populate the at least one of protocol headers and packet payload data includes randomly adding, deleting, or populating the protocol headers using the selected second values.

6. The method of claim 1 wherein using the selected second values to manipulate the content of the first N bytes of the payloads includes randomly adding, deleting, or populating the first N bytes of the payloads using the selected second values.

7. The method of claim 6 wherein the first N bytes of each of the payloads comprise a pseudo header.

8. The method of claim 1 wherein utilizing the second values to statistically vary an aspect of the test packets includes assigning packet streams to output ports or port groups using the selected second values.

9. The method of claim 1 wherein using the selected second values to statistically vary an aspect of the test packets includes generating bursts of traffic that vary over time according to the selected second values.

10. A system for generating and using a statistical mix of network traffic to test a network device, the system comprising:
    a packet generator for generating test packets to be transmitted to a device under test;
    a random number generator to generate first values that statistically vary according to a first probability density function;
    a memory for storing a plurality of second values that statistically vary according to a second probability density function different from the first probability density function;
    a randomizer for using the first values to access the memory and select from the second values and providing the selected second values as output;
    a P4 programmable packet transmit pipeline that does not permit modification of packet payloads for parsing the test packets to place packet headers in packet header vectors, a first N bytes of packet payloads in the packet header vectors, thereby treating the first N bytes of the packet payloads as a fake or pseudo-header so that the first N bytes of the packet payloads will be processed by the P4 programmable transmit pipeline, and remaining bytes of the packet payloads in a payload buffer, propagating the packet header vectors down the P4 programmable packet transmit pipeline, using the selected second values output from the randomizer to statistically vary an aspect of the test packets, wherein using the selected second values to statistically vary an aspect of the test packets includes using the selected second values to randomly add, delete, or populate at least one of protocol headers and packet payload data, wherein using the selected second values to randomly add, delete, or populate the at least one of protocol headers and packet payload data includes using the selected second values to manipulate content of the first N bytes of the payloads in the packet header vectors in real time at a predetermined point in the P4 programmable packet transmit pipeline, and the P4 programmable packet transmit pipeline is configured to deparse the packet header vectors and the packet payloads to form reassembled test packets and transmit the reassembled test packets to the device under test.

11. The system of claim 10 wherein the first probability density function comprises a native probability density function of the random number generator.

12. The system of claim 11 wherein the second probability density function comprises a non-native probability density function.

13. The system of claim 10 wherein using the selected second values to statistically vary an aspect of the test packets includes rate limiting the test packets using the selected second values.

14. The system of claim 10 wherein using the selected second values to randomly add, delete, or populate the at least one of protocol headers and packet payload data includes randomly adding, deleting, or populating the protocol headers using the selected second values.

15. The system of claim 10 wherein using the selected second values to manipulate the content of the first N bytes of the payloads includes randomly adding, deleting, or populating the first N bytes of the payloads using the selected second values.

16. The system of claim 15 wherein the first N bytes of each of the payloads comprise a pseudo header.

17. The system of claim 10 wherein using the selected second values to statistically vary an aspect of the test packets includes assigning packet streams to output ports or port groups using the selected second values.

18. The system of claim 10 wherein using the selected second values to statistically vary an aspect of the test packets includes generating bursts of traffic that vary over time according to the selected second values.

19. A non-transitory computer readable medium having stored thereon executable instructions that when executed by a processor of a computer control the computer to perform steps comprising:

generating test packets to be transmitted to a device under test;

parsing the test packets to place packet headers in packet header vectors, a first N bytes of packet payloads in the packet header vectors, thereby treating the first N bytes of the packet payloads as a fake or pseudo-header so that the first N bytes of the packet payloads will be processed by the P4 programmable transmit pipeline, and parsing remaining bytes of the packet payloads in a payload buffer;

propagating the packet header vectors down a P4 programmable packet transmit pipeline that does not permit modification of packet payloads;

utilizing a random number generator to generate first values that statistically vary according to a first probability density function;

precalculating and storing in memory a plurality of second values that statistically vary according to a second probability density function different from the first probability density function;

using the first values to access the memory and select from the second values;

using the selected second values to statistically vary an aspect of the test packets, wherein using the selected second values to statistically vary an aspect of the test packets includes using the selected second values to randomly add, delete, or populate at least one of protocol headers and packet payload data, wherein using the selected second values to randomly add, delete, or populate the at least one of protocol headers and packet payload data includes, for each packet, using the selected second values to manipulate content of the first N bytes of the payloads in the packet header vectors in real time at a predetermined point in the P4 programmable packet transmit pipeline;

deparsing the packet header vectors and the packet payloads to form reassembled test packets; and transmitting the reassembled test packets to the device under test.

* * * * *